United States Patent

Böhme et al.

[11] 4,081,671
[45] Mar. 28, 1978

[54] PHOTOELECTRIC LINE FOLLOWER

[75] Inventors: Dietrich Böhme, Kahl (Main); Günter Hellmut Schumann, Ober-Roden; Günter Hahn, Hausen; Rolf Jung, Waiblingen, all of Germany

[73] Assignee: Messer Griesheim GmbH, Frankfurt am Main, Germany

[21] Appl. No.: 711,844

[22] Filed: Aug. 5, 1976

[30] Foreign Application Priority Data

Aug. 2, 1975 Germany .............................. 2534589

[51] Int. Cl.² .............................................. G05B 1/00
[52] U.S. Cl. .................................... 250/202; 318/577
[58] Field of Search .................. 250/202, 214 R, 209; 318/577

[56] References Cited

U.S. PATENT DOCUMENTS

| 3,566,129 | 2/1971 | Bardwell et al. | 318/577 |
| 3,883,735 | 5/1975 | Murphy et al. | 250/202 |
| 3,920,316 | 11/1975 | Daguillon | 250/202 |

Primary Examiner—David C. Helms
Attorney, Agent, or Firm—Connolly and Hutz

[57] ABSTRACT

An arrangement for cutting workpieces with a scanning device having a signalling photoresistor which detects markings, with an attached control device which contains a first timing element to which a switch for reducing the rate of speed is connected includes an OR-element connected between the first timing element and the switch with a further timing element connected by means of an AND-element to the input and output of the timing element with the input of the further timing element being connected to the output of the AND-element and the output of the further timing element being operationally connected to the input of the OR-element.

4 Claims, 3 Drawing Figures

PHOTOELECTRIC LINE FOLLOWER

BACKGROUND OF THE INVENTION

The invention relates to an arrangement for cutting workpieces with a scanning device which includes a signalling photoresistor for sensing marks with an attached control device, whereby the control device contains a first timing element to which a switch is connected for switching to a reduced rate of feed. This type of arrangement is disclosed in the German patent application No. P 23 490 735.5 (DT-OS No. 2 349 073) which represents the state of the art from which the invention departs.

With the arrangement described in this DT-OS, it is advantageously possible to precisely detect the smallest deviation and sharp corners and to guide a tool according to the scanning pattern, whereby the scanning system remains stable during the whole scanning process. To this can be attributed the fact that in each case, a reduced rate of feed occurs before reaching a deviation to be circumvented. In the explanatory example of the scanning control as described in the DT-OS, the rate of feed is switched back to fast motion after a predetermined time which can be set on the first timing element. Practice has shown that the distance between a first and second mark, both of which should serve for switching to a reduced speed, can be small enough so that the predetermined time for slow speed is just ended, and an impulse for fast speed is delivered, when the signalling photoresistor is driven over the second mark, which releases an impulse for slow speed. These contradictory impulses can nevertheless lead to faulty control, whereby the scanning accuracy as well as the quality of the cut can be unfavorably influenced.

SUMMARY OF THE INVENTION

An object of the invention is to achieve an arrangement of the type originally mentioned, which does not exhibit the above mentioned drawbacks, and which also delivers accurate scanning results as well as good quality of cut, where the provided marks occur in quick succession.

The object according to the invention is achieved by having an OR-element connected between the first timing element and the switch; additionally, the input and the output of the first timing element are connected through an AND-element to a second timing element; and furthermore, the output of the additional time component is operationally connected with an input of the OR-component.

With the invention, it is advantageously possible to also detect slow marks, which are arranged in close succession and to achieve a corresponding reduced speed, so that the above mentioned disadvantages are advantageously avoided. This can especially be traced back to the second timing element so that both timing elements as provided according to the invention allow for an appropriate extension of the reduced speed period. Only when in a predetermined time no more slow marks appear there results again a switching to fast speed.

THE DRAWINGS

DETAILED DESCRIPTION

Figure 1:
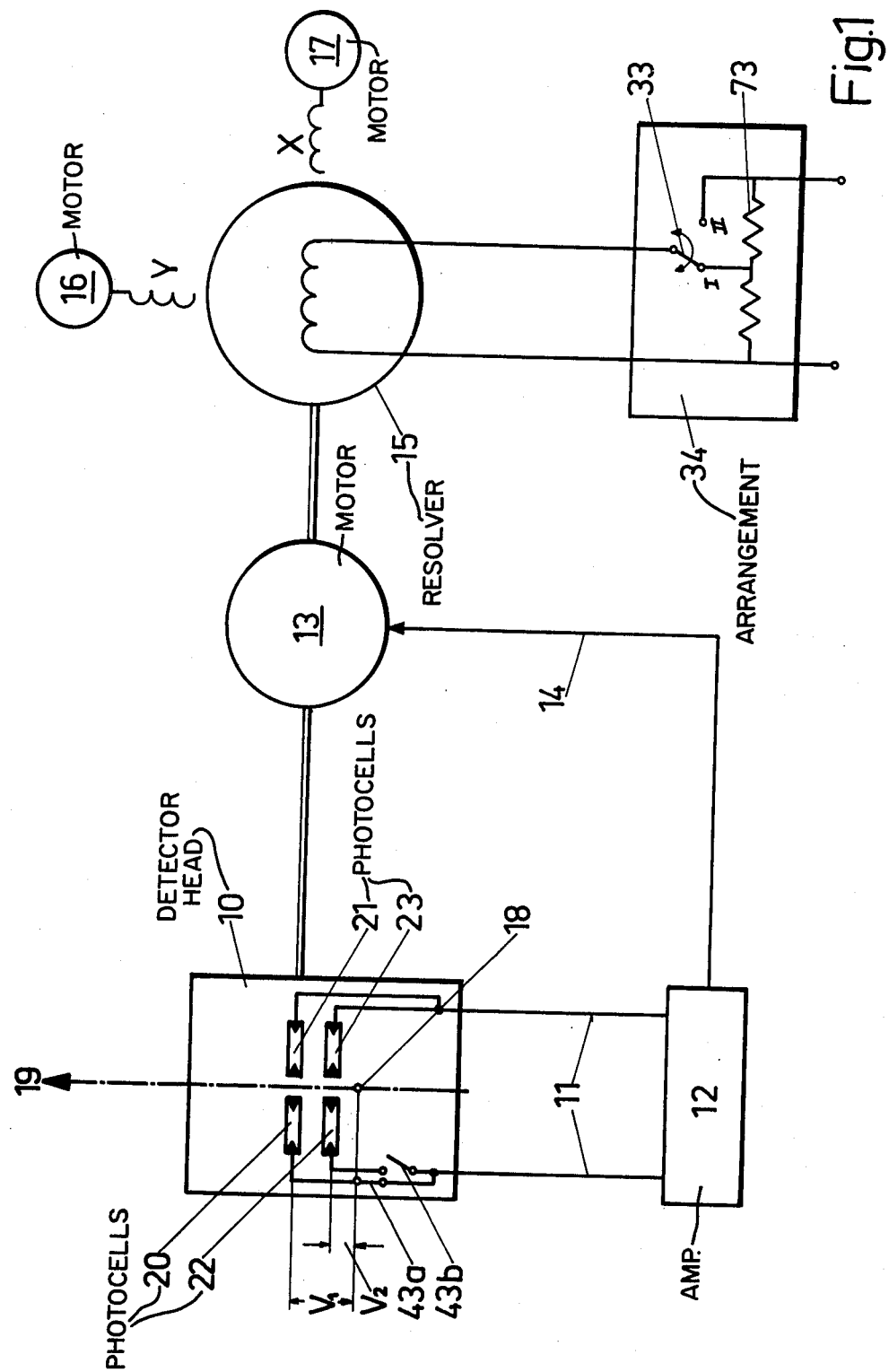
FIG. 1 is a block circuit diagram of a photoelectric copying control device.

FIG. 1 illustrates a photoelectric detector head 10; the control signals which mark the relative position of the detector head with respect to the line to be scanned and which are carried via or lines 11 to an amplifier step. The construction of the detector head is not described or illustrated in detail since such details are not essential for understanding the invention.

The detector head 10 is mechanically coupled in known fashion with a finishing/leveling motor 13 which turns the detector head 10 and if occasion arises, the tool connected to it (cutting knife, laser, plasma or autogenous torches or the like) according to the delivered control which are conducted to the motor 13 from the amplifier 12, via cables 14, in the changing direction tangent to the path to be scanned. The finishing/leveling motor 13 is further connected to a resolver 15, which causes a breakdown of the shifting motion of the motor 13 into an X-component and a Y-component. As a result of the output signals of the resolver 15, both coordinating motors (feed motors) 16 and 17 respectively are controlled.

The detector head 10 can be rotated about a swivel axis and exhibits two differential photocells, one after the other and pretransposed in relation to the swivel axis 18, which are each made of two photoresistors 20, 21 and 22, 23 respectively, their distance from one another being smaller than the width of the stroke of the scanning line of the pattern/model diagram. The signalling photoresistor 24 is connected with control devices which are illustrated in more detail in FIGS. 2 and 3.

Figure 2:
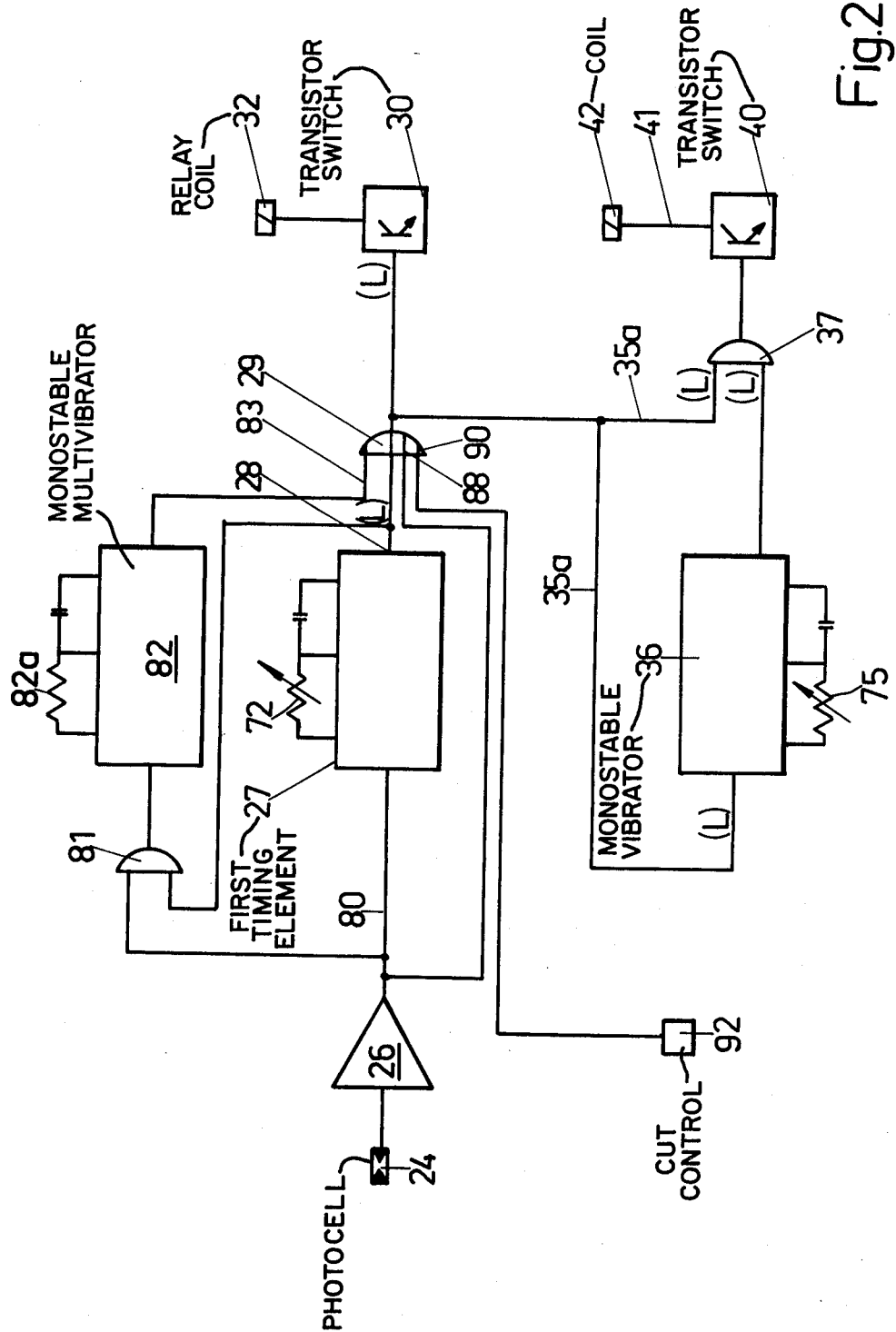
FIG. 2 is a block circuit diagram of a control device characteristic of the invention.

The control device according to FIG. 2 consists of an amplifier 26 connected with the signalling photoresistor after which a first timing element (monostable vibrator) is placed. The output of the multivibrator 27 is connected, via an OR-element to a transistorized switch, which exhibits a relay coil 32 in the commutator branch, the switch contact of which lies in the provided arrangement 34 for the resolver 15, as illustrated in FIG. 1 and which serves switching speeds. Furthermore, the output 28 is connected via a braching cable to a second timing element (monostable vibrator) 36 (cable 35a), as well as with an AND-element, a transistor switch 40 is connected, in the commutator branch 41 of which there is a relay coil 42, the switching contacts 43a and 43b which serve for switching from the first differential photocell to the second (see FIG. 1).

According to the invention, the input 80 and the output 28 of the first timing element 27 are connected via an AND-element 81 with an additional third timing element 82. The timing element (monostable multivibrator) 82 is operationally connected to an input 83 of the OR-element 29.

As it further results from FIG. 2, according to the invention, an additional input 88 of the OR-element 29 is connected to the output 80 of the signalling photoresistor 24. The input 90 of the OR-component 29 is further connected to the output of a known automatic initial cut control 92.

By automatic initial cut control is understood a device through which, the scanning device is brought up to the diagram contour and which then switches itself on when it reaches the contour; in other words, the scanning beam runs, after actuation of a push button, in a straight line with pattern up to the predetermined diagram contour and then switches to automatic control.

The functioning of the device described above is illustrated by means of FIG. 3 in which a partially shown diagram pattern is illustrated. As is apparent from this description the device may function effectively as a line follower.

Figure 3:
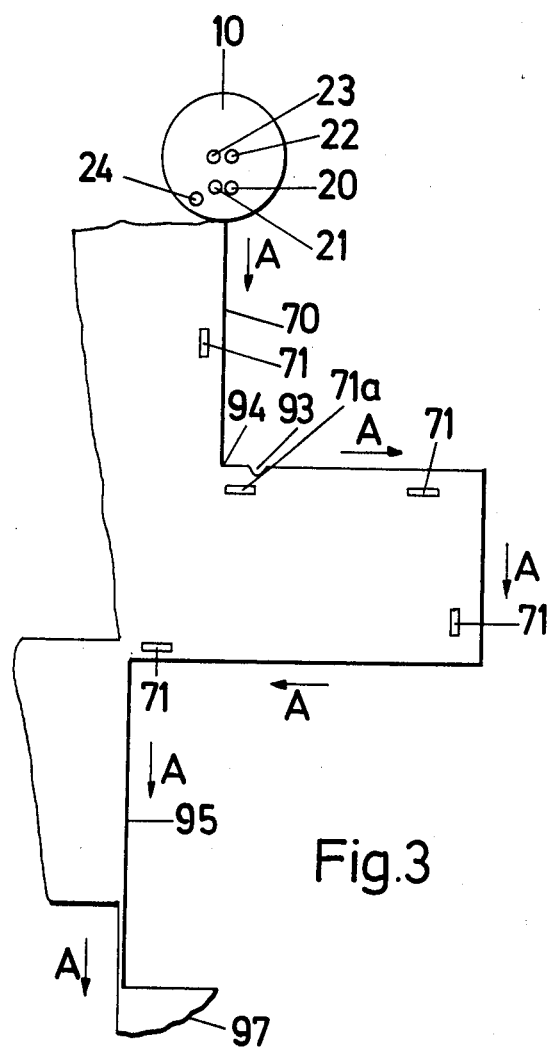
FIG. 3 is a section from a pattern diagram (sample cut model pattern).

The edge to be scanned is indicated as 70 in FIG. 3. In FIG. 3, the detector head 10 of the scanning device is furthermore indicated, which has the differential photocells 20, 21 and 22,23 respectively, as well as an additional detecting organ in the form of the signalling photoresistors 24, 25. While the photoresistors 20, 21, 22, 23 of the differential photocells lie adjacent or partially overlap the edge 70, the signalling photoresistor 24 is at a predetermined distance from the edge 70 and preferably a distance of about 2 to 4 mm. Delaying marks are provided at a distance from and on the same side of edge 70. The delaying marks 71 are found along line 70 in the direction of motion of the scanning device as indicated by the arrows, actually at a given distance from points at which a change in direction of predetermined magnitude of the edge 70 is realized. These points are, in the example shown, among others, the interrupgtion due to right angle corners or else notches 93. The distance of these delaying marks from these corners amounts to about 20 mm.

For proper scanning, the detector head is driven into the initial cut position by the automatic initial cut control 92, whereby a signal L is placed at the input of the switch 30.

The signal L drives the transistor switch 30 whereby the coil 32 is energized and the contact 33 is switched to position I. With this, the resistor 73 is switched into the resolver supply circuit, the resolver's voltage supply becomes smaller and the rate of feed of the motor is reduced. The magnitude of the reduction in speed can be adjusted at the resistor 73. Thus the detector head is driven at slow speed into the cutting position then switched to fast speed (cut control 92 no longer emits a signal) and is driven at high speed in the direction of the arrow(s) A to the first mark 71.

Upon detecting a delaying mark 71, a signal is produced by the signalling photoresistor 24, which guides/controls the multivibrator 27, so that it emits a signal L for a period of time adjustable at the resistor 72 whereby the rate of feed is reduced again.

In the case of the initial cut as well as with the essential cut, the signal L is at the same time conducted via cable 35a to the second monostable vibrator 35, which after a time period $t_2$, adjustable with a variable resistor, becomes non-conducting and then emits a signal $L_1$. The time period $t_2$ is so adjusted that the signal $L_1$ results only when the rate of feed is at the present reduced value. The signals L and $L_1$ are conducted to the AND-element 37, open the latter and cause the transistor switch 40 to be driven. As a result of this, the coil 42 is energized, the contact 43a is opened and the contact 43b is closed. It is no longer the first differential photocell 20, 21 with large lead (about 6 mm) factor, but rather the second differential photocell 22, 23 with small lead (about 0.5 mm), which determines the scanning of the edge 70.

The corner 94 is thus by-passed with reduced speed and small lead. After the elapsing of time period $t_1$, which is set so as to guarantee that the detector head bypasses the corner with minimized values, the signal L becomes zero. As a result of this, both transistor switches 30 and 40 are closed, the contact 33 is switched to II, the contact 43a closed and the contact 43b opened. The original high rate of feed as well as the large lead are again in effect.

Should there be in the immediate vicinity of the corner 94, for example, a second point at which a change in direction is required, like an indentation 93, it can then happen that the time period $t_1$ has just elapsed and the feed is switched to fast motion when the indentation is reached by the photoreceivers. In order to avoid this, the timing element 82 is provided according to the invention. Should the signalling photoresistor 24 now detect the provided delaying mark 71a immediately before the indentation 93, whereby as already mentioned — the machine is moved at low speed on account that time $t_1$ has not yet elapsed, there result a signal L which is conducted to the input of the AND-element 81 thereupon likewise emits a signal L through which the time element 82 is switched on and emits a signal L for a time period $t_4$ which can be present at the resistor 82a, since the switch 30 is held at the slow setting. Should there be no further mark 71 during the time period $t_4$ — if yes, the slow motion would be retained by the time element 27 — then the machine switches over to fast motion. Thus, as a result of the invention, optimal scanning and cutting is achieved with simple markings as well as with marks arranged in close succession.

Furthermore, as a result of the invention, a switching over from fast motion to slow motion is achieved when the detector head is moved from component 95 over the connecting path to component 97. In this case, the signalling photoresistor 24 is moved into the range/vicinity of the white template and there results again at the output of the OR-element 88, an output signal, which accordingly actuates the switch 30.

Even though the invention was mainly explained in terms of edge scanning, it is understood that the invention can also be employed advantageously for working according to the so-called line scanning process.

Thereupon, it is obviously possible to fit in electronic components instead of the mechanical components or relays.

What is claimed is:

1. In an arrangement for cutting workpieces with a scanning device which includes a signalling photodetector for detecting markings and with an attached control device which contains a first timing element to which is connected a switch for switching to a reduced rate of feed, the improvement being an OR-element connected between said first timing element and said switch, a further timing element being connected by means of an AND-element to the input and the output of said first timing element, the input of said further timing element being connected to the output of said AND-element, and the output of said further timing element being operationally connected to an input of said OR-element.

2. Arrangement according to claim 1, characterized by a further input of the OR-element being connected to the output of the signalling photodetector.

3. Arrangement according to claim 2, characterized by the output of an automatic initial cut control being attached to an other input of the OR-element.

4. Arrangement according to claim 1, characterized by the output of an automatic initial cut control being attached to an other input of the OR-element.

* * * * *